Dec. 5, 1967   G. MUGNIER ET AL   3,356,978
HIGH VOLTAGE REACTANCE ASSEMBLY INCLUDING PAIRS OF
INTERLINKED LAMINATED FRAME MEMBERS
Filed July 15, 1965   2 Sheets-Sheet 1

INVENTORS
Georges Mugnier
Efraim Rubinowicz
By Paul M. Craig, Jr.
ATTORNEY

INVENTORS
Georges Mugnier
Efraim Rubinowicz

By Paul M. Craig Jr.
ATTORNEY

United States Patent Office 3,356,978
Patented Dec. 5, 1967

3,356,978
HIGH VOLTAGE REACTANCE ASSEMBLY IN-
CLUDING PAIRS OF INTERLINKED LAMI-
NATED FRAME MEMBERS
Georges Mugnier, Boucher, and Efraim Rubinowicz, Aix-
Les-Bains, France, assignors to Compagnie Generale
D'Electricite, Paris, France, a corporation of France
Filed July 15, 1965, Ser. No. 472,113
Claims priority, application France, July 16, 1964,
981,901
24 Claims. (Cl. 336—84)

ABSTRACT OF THE DISCLOSURE

A high voltage reactance assembly wherein a high voltage reactance is enclosed within a magnetic flux intercepting arrangement in the form of first and second pairs of spaced, parallel substantially rectangular laminated frames interlinked in the manner of a chain and supporting said reactance so that one face thereof is in contact with one side of one pair of frames and the other face of said reactance is in contact with one side of the other pair of frames.

---

The present invention relates to improvements in high voltage reactance assemblies and more particularly to reactance assemblies comprising reactance coils immersed in an insulating or cooling fluid contained in a tank.

It is advantageous in such systems to reduce the size of the housing or tank enclosing the coils as much as possible but the reduction of the distance between the walls of the housing and the coils causes an important loss of electromagnetic energy by way of rotary currents and hysteresis heating resulting from the magnetic flux of the coils reaching this wall. In such cases it is known to provide the reactance assembly with a magnetic screen capable of reducing the magnetic flux leakage of the coil. Such magnetic screens effectively permit the use of a housing having a reduced size, but the construction of these screens itself provides certain difficulties. In particular, one must provide means for supporting the coils within the housing and the magnetic screen and means for connecting the coils with the electric line without increase in the mangetic flux leakage, especially at the front faces of the coils.

The object of the present invention is to provide a magnetic screen structure reducing the magnetic flux leakage to an acceptable minimum while allowing easy access to the coils and effective holding of the coils within the screen and the housing. Another object of the invention is to provide a structure comprising a high voltage reactance and a magnetic screen, easily adaptable to different housings.

Still another object of the invention is the provision of a magnetic screen structure having simple and easily constructed elements adaptable for different kinds of reactance assemblies, and more particularly for multiphase reactance assemblies having a plurality of coils.

The invention has also for its object to provide means for securing a high voltage inductance having a magnetic screen within a housing or tank containing a fluid.

The magnetic structure according to the present invention comprises at least two interlinked substantially rectangular frames each surrounding the coil, two sides of each frame being approximately parallel to the coil axis, while the other two sides are located in front of the front faces of the coil and having different directions in each frame—both of these frames being fitted into position by making only one of their sides bear against a given front face of the coil.

According to a particularly advantageous embodiment of the invention, the magnetic screen is made up of two pairs of magnetic frames, the sides of the frames of each pair being respectively parallel, said two pairs of frames being substantially perpendicular to each other, so as to form, before each front face of the coil, an opening enabling the stem of a high voltage connector to pass through into the coil, which connector may be further secured to a wall of the tank or housing enclosing the reactance coil.

The high voltage lead-through connectors may thus be connected, inside the coils, to their lead-in conductors. As a result, the lateral dimensions of the assembly may be much smaller than those of the assemblies having the high voltage connectors fitted on the side wall of the tank or housing.

The invention may also apply to a reactance assembly having a plurality of coil units, for example, for use with a polyphase electric line.

According to one embodiment, a coil is provided for each phase of a line: the coils, having a generally cylindrical configuration, are disposed in a single row, with their axes substantially parallel to each other, inside a closed magnetic circuit comprising a first pair of generally rectangular planar frames made of mangetic material. Each frame has two side portions substantially parallel to the axis of the coils, and upper and lower portions located in front of the front faces of all of the coils. To each coil is associated a second pair of similar frames, placed in a plane different from and preferably substantially perpendicular to that of the first pair of frames. The second pairs of frames are interlinked with the first pair of frames so that one front face of the coil bears against the inner face of the upper sides of the pair of first frames and the other front face of the coil bears against the inner face of the lower sides of a pair of second frames. The upper sides of the pair of second frames intersect with the upper sides of the pair of first frames so as to define a substantially rectangular aperture through which passes a high voltage connector connected with the conductor of the coil.

These and other features of the invention will be apparent from the following description of embodiments of the invention to be taken with reference to the accompanying drawings, in which.

A particular feature of the reactance coils of the invention is the magnetic screen intended for collecting the leakage fluxes. Said screens consist of rectangular frames made up magnetic laminations stacked parallel to the frame plane and interleaved at the corners of said frames.

Figure 1:
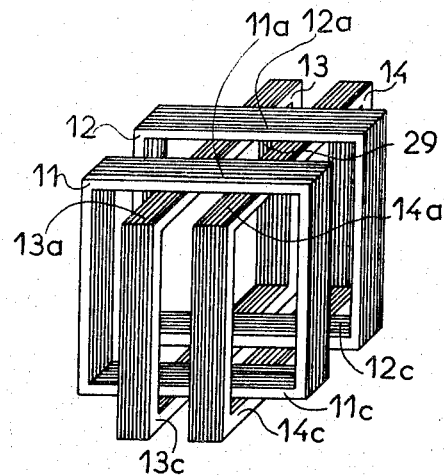
FIGURE 1 is an isometric view of two pairs of frames made up of stacks of magnetic laminations for the magnetic screening of a reactance coil.
Figure 2:
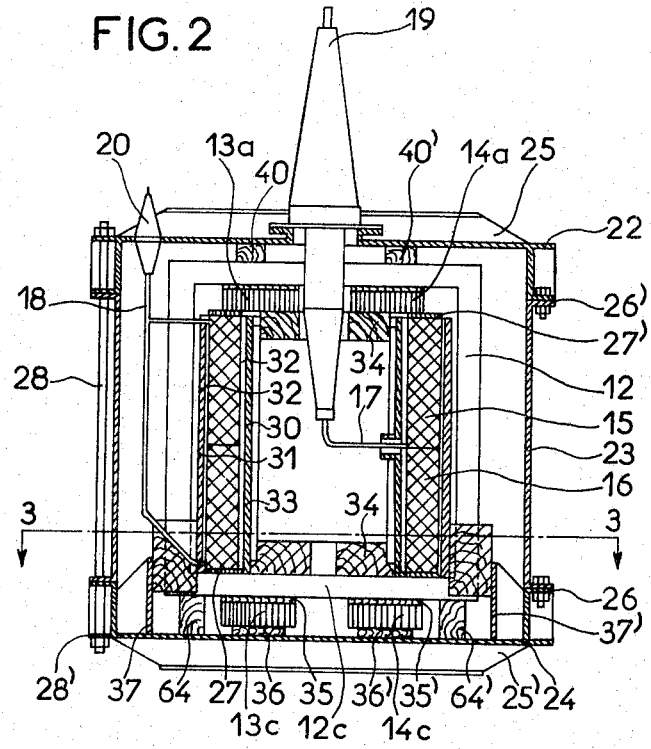
FIGURE 2 is a sectional elevation of a single-phase reactance coil immersed in a tank.

The magnetic screen of FIGURE 1 is intended for surrounding a single phase reactance coil having a generally cylindrical lateral face and two front faces, one of said faces having a high voltage connector. Such a coil is illustrated in FIGURE 2.

The magnetic screen comprises two pairs of frames, respectively, 11, 12, 13 and 14, each having a substantially rectangular shape. The frames 11 and 12 are disposed in two planes substantially perpendicular to the substantially parallel planes of frames 13 and 14. Lower portions 11c and 12c of the frames 11 and 12 are perpendicular to the planes of frames 13 and 14 and are surrounded by the latter frames. The intersection of sides 11a, 12a, 13a and 14a of the frames define an access 29 for the connector of the reactance coil to pass through, the coil being placed inside the frames as shown in the sectional view of FIGURE 2.

The coil is set into position so that each pair of these frames bears against only one of the two support faces of the coil. The frames 13 and 14 will thus bear against the coil upper front face by means of their upper horizontal portions 13a and 14a while the lower horizontal portions 13c and 14c run below the lower front face, at a sufficient distance for enabling the passage of the lower horizontal portions 11c and 12c of the frames 11 and 12. Inversely, the frames 11 and 12 will bear against the coil lower front face and their upper horizontal portions 11a and 12a run slightly above the corresponding horizontal portions 13a and 14a of the frames 13 and 14.

The frames of one pair are thus interlinked with the frames of the other pair and only a slight axial clearance is required for making possible the setting into position of the frames, the screen bearing perfectly against each of the two front faces of the reactance coil. The two pairs of frames may then be axially adjusted with respect to each other, the leakage flux being to a certainty reduced to a minimum.

Figure 3:
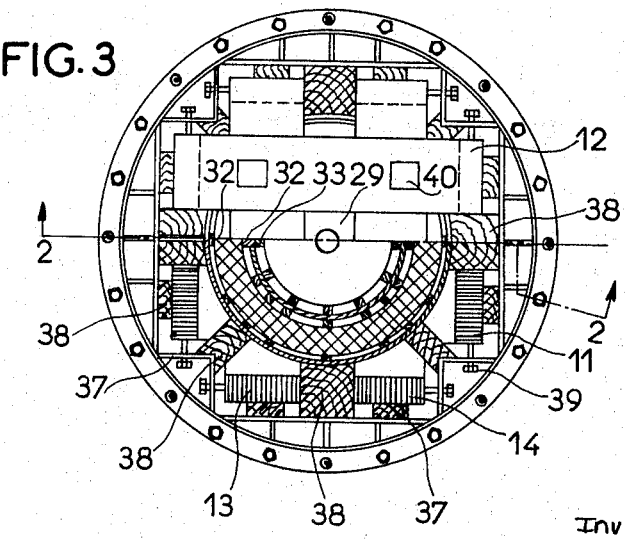
FIGURE 3 is a plan view of the reactance coil of FIGURE 2, the lower half-section being taken along the axis 3—3 of FIGURE 2 and the top half-view being as seen from the top assuming that the lid of the tank and through connectors having been removed.

FIGURES 2 and 3 show, by way of example, such a magnetic screen which is here used for surrounding a single phase reactance coil. This coil comprises two superposed cylindrical parts 15 and 16, which are connected in parallel by means of their adjacent ends, substantially half-way up the coil, to a high voltage lead-in conductor 17. The lead-out terminals of these two circuits in parallel are thus located on the front faces of the coil where they are connected to a common lead-out conductor 18 to be connected to a neutral conductor or to earth.

The magnetic screen is made up of two pairs of rectangular frames 11 and 12, 13, and 14, designed as described above. The reactance coil is set into position by making its lower front face bear against the lower horizontal portions of the frames 11 and 12, while the upper horizontal portions of the frames 13 and 14 bear against the upper front face of the coil.

As the ends of the coil are substantially at earth potential, thin pieces such as 27 and 27' made of insulating material may be interposed at the seating points between the coil and the frames, which results in a further increase in the screen efficiency.

The distance between the upper or lower horizontal sides of different pairs of frames is adjusted by means of shims 35 and 35' once the magnetic screen has been made to bear satisfactorily against the two front faces of the coil.

The coil and its screen are both immersed in oil within a tank comprising a bottom part 24 in the shape of a dish, a cylindrical section 23 attached to the bottom part 24 by means of a flanged joint 26, and a lid 22 attached to the cylindrical section 23 by means of a flanged joint 26'.

As described above, the horizontal portions of the four frames 11, 12, 13 and 14 intersect at right angle so as to leave between them a space shown as 29 on the upper part of FIGURE 3. A high voltage lead-through connector 19 preferably secured to the lid 22 in front of the opening 29 comprises an insulating connector stem with a length sufficient for passing through the magnetic screen to penetrate into the reactance coil where the connector is easily connected to the high-voltage lead-in conductor 17 The lead-out conductor 18 connected to both ends of the coil passes in the space between two vertical sides of the frames 11 and 12 and runs up to a lead-out terminal 20 also attached on the tank lid 22.

The magnetic screen may thus be at a relatively short distance from the lid 22, as well as from the tank side wall due to the yoke effect of the frames, and the size and shape of the frame structure is such that a more compact tank configuration may be utilized since the shape of the frames corresponds closely with the shape of the coil.

Means are provided for a rigid fastening of the coil and its magnetic screen within the tank. Coils 15 and 16 are held between concentric insulating cylinders, such as 30 and 31. For the sake of clarity, only two of these insulating cylinders have been shown. The cylinders are set by means of longitudinal shims 32, selectively spaced around the circumference of the cylinders and providing between themselves channels for oil circulation. The inner insulating cylinder 30 bears against the longitudinal shims 33 attached at their ends of the periphery of the circular blocks 34, which are provided with a central opening for accommodating the connector 19.

The assembly thus obtained is set into position on the dished bottom 24 before mounting the cylindrical section 23. The lower portions, such as 11c, 12c, 13c and 14c, of the four frames 11, 12, 13 and 14 are held on blocks 64, 64', and 36, 36' located in the tank bottom 24, the height of which is so designed as to enable a satisfactory positioning of the coil.

Metallic partitions such as 37 are set in a vertical position in the tank dished bottom 24. These metallic partitions are so located that the plane of the screen frames is positioned in front of and parallel to them. Insulating blocks 38 are inserted between the frames and the partitions 37, and between the coil and partitions 37, as seen in FIGURE 3.

Preferably the frames are made of stacks of laminations tightened together by screw jacks 39, which are, for example, threadably engaged with the angle partitions 37 so as to apply pressure against the outer laminations of each pair of frames.

Insulating blocks 40 and 40' are provided on top of the upper horizontal portions of the frames 11 and 12, at the intersection of the pairs of frames. The height of the blocks 40 is selected so that after the installation of the cylindrical section 23 and of the lid 22, the latter exerts on the blocks 40 a pressure capable of ensuring a vertical fastening of the assembled components within the tank. The horizontal walls of the lid 22 and bottom 24 are, for this purpose, provided with stiffeners 25 and 25' of known design so as to ensure wall rigidity.

The tank components are tightened together in the axial direction by means of the flanged joints 26, 26' and, in addition by rods 28 which pass through the flanges 26 and the protruding rims 28' of the lid and bottom against which nuts are screwed on the ends of the rods 28 and are tightened up.

It is noted that with this magnetic screen made up of interlinked frames, said frames may contribute to the axial tightening of the coil, since only one side of each of the frames bears on the coil and they can thus transmit the tightening pressure without any risk of distortion. Their efficiency in this respect can be further improved by eliminating the blocks 36 and 36' which are interposed between the tank bottom and the lower portions of the frames 13 and 14, and keeping only the blocks 64 and 64' which support the lower portions of the frames 11 and 12. Similarly, it may be beneficial to transmit to the coil the pressure exerted by the lid 22 by making the blocks 40 bear on the frames 13 and 14 and not on the frames 11 and 12. It is also possible to replace these blocks 40 by adjustable tightening devices or by blocks of great elasticity in the axial direction, as it is also possible to improve the tightening of the coil by inserting blocking devices such as 35 and 35' for holding apart the inner face of the portions 63 and 63' and 65, respectively.

Similar magnetic screens to that described above may be designed for each of a group of reactance coils intended for a polyphase electric line, usually contained in a single tank.

Figure 4:
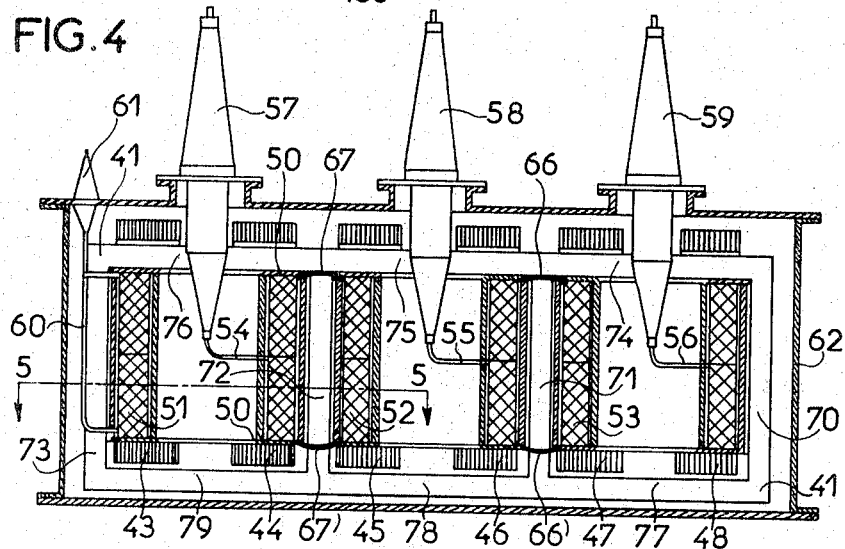
FIGURE 4 is a schematic sectional elevation of an arrangement of three reactance coils intended for a three-phase electric line.
Figure 5:
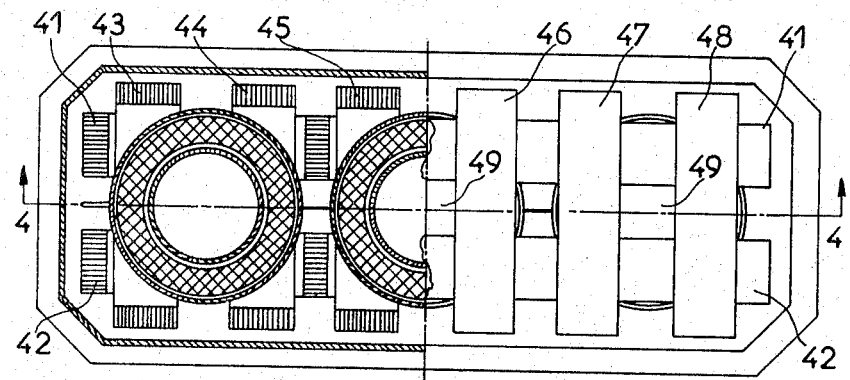
FIGURE 5 is a schematic plan view of the reactance coil arrangement of FIGURE 4, in which the left-hand part is a section along the axis 5—5 of FIGURE 4 and the right-hand part a view from the top, the tank lid and lead-through connectors having been removed.

According to another embodiment of the invention, a single pair of magnetic frames may surround all the coils of a group of coils intended for a polyphase electric line, as shown schematically, by way of example, in FIGURES 4 and 5.

Three reactance coils 51, 52 and 53 intended for a three-phase electric line, are arranged in line in a same tank, their axes being parallel to one another in a common vertical plane.

As in the preceding example, the reactance coils are made up of two superposed cylindrical parts, which are connected in parallel by means of their adjacent ends, to high-voltage lead-in conductors 54, 55 and 56. The lead-out terminals of these circuits in parallel are interconnected by conductors 66, 67, 66', 67' located similarly, on the upper and lower front faces of the coils, where they are connected to a common lead-out conductor 60 to be linked to a neutral conductor or to earth.

These reactance coils together with magnetic screens made up of frames constituted by stacks of magnetic laminations interleaved at the ends of the frame sides, are immersed in oil within a tank 62.

The magnetic screen may comprise one, or two frames such as 41 and 42. Referring to FIGURE 4, the frame 41 comprises a series of vertical portions 70, 71, 72 and 73, upper horizontal portions 74 and 75 and lower horizontal portions 77, 78 and 79 defining three windows within which are located the coils 53, 52 and 51.

The magnetic screen further comprises at least a second frame associated with each coil, such as the frames 43, 44, 45, 46, 47, and 48 illustrated in FIGURE 5. When considering the part of the screen comprising the portions 72, 73, 76 and 79, of the first frames 41 and 42 and the frames 43 and 44, one will see that the structure is similar to the structure described above with reference to FIGURES 1, 2 and 3. Thus the magnetic screen of FIGURES 4 and 5 may be considered as a combination of three magnetic screens such as that of FIGURES 1–3 where the frames referred to as "first frames" are made of one piece.

Rectangular frames 43 and 44 are interlinked with the first window of the frames 41 and 42, so as to surround the coil 51 in a perpendicular direction to that of the first pair of frames. Two rectangular frames 47 and 48 are interlinked with the third window of the frames 41 and 42, so as to surround the coil 53.

The coils are set into position by making the upper horizontal sides of the frames 41 and 42 bear on each of the upper front faces of the coils, only through a thin piece of insulating material 50, since the voltage of these front faces differs only little from that of earth.

The length of the vertical sides of the frames 41 and 42 is selected in order that the lower horizontal sides of these frames might slide under the lower front faces, leaving a large enough space for accommodating the lower horizontal sides of the transverse frames 43, 44, 45, 46, and 48 on which the lower front faces of the coils bear, also via a thin piece of insulating material 50.

The adjustment of the transverse frames 43 to 48 with respect to the frames 41 and 42 is achieved as in the preceding case, once a correct bearing is achieved between the front faces of the coils and the magnetic screens.

The upper horizontal sides of these frames form, similarly, rectangular spaces in front of the center openings of the coils. The tank lid 62 may thus be located at a relatively short distance from the magnetic screens, since it is thus possible to attach on this lid high-voltage lead-through connectors 57, 58, and 59, the stems of said connectors passing through said rectangular spaces of the magnetic screens in order to connect within the coils to the lead-in conductors 54, 55 and 56.

The lead-out conductor 60 runs between the vertical sides of the frames 41 and 42 in order to be connected to a lead-out terminal 61 attached on the tank lid.

The adjustment of each of the components within the tank 62 is not shown in the schematic illustration in FIGURES 4 and 5; however, it may be designed on the same principles as described in connection with the embodiment of FIGS. 1, 2 and 3. It is noted that the number of frames has been selected only as exemplary of an illustrated embodiment; however, it is obvious that the number of frames associated with a given coil may be as few as one or any number more than one without departing from the scope of the invention.

We claim:
1. In a high voltage reactance assembly
a high voltage reactance means of generally cylindrical configuration having two opposite front faces, and
means for intercepting the magnetic flux leakage of and for supporting said reactance means including first and second frame means each having at least an annular frame defining a closed, substantially planar magnetic circuit having substantially parallel upper and lower portions, the annular frames of said first and second frame means being interlinked in the manner of a chain,
said reactance means being positioned inside said first frame means and said second frame means with a first of said front faces of said reactance means bearing against the inner face of said upper portion of said first frame means and the second of said front faces bearing against the inner face of said lower portion of said second frame means.

2. In a high voltage reactance assembly
a high voltage reactance means of generally cylindrical configuration having two opposite front faces and
means for intercepting the magnetic flux leakage of and for supporting said reactance means including first and second frame means each having at least an annular frame defining a closed, substantially planar magnetic circuit having substantially parallel upper and lower portions, the annular frames of said first and second frame means being interlinked in the manner of a chain,
said reactance means being positioned inside said first frame means and said second frame means with a first of said front faces of said reactance means bearing against the inner face of said upper portion of said first frame means and the second of said front faces bearing against the inner face of said lower portion of said second frame means,
said annular frame having lateral portions interconnecting said upper and lower portions and being substantially parallel to the symmetry axis of said reactance means.

3. In a high voltage reactance assembly
a high voltage reactance means of generally cylindrical configuration having two opposite front faces, and
means for intercepting the magnetic flux leakage of and for supporting said reactance means including first and second frame means each having at least an annular frame defining a closed, substantially planar magnetic circuit having substantially parallel upper and lower portions, the annular frames of said first and second frame means being interlinked in the manner of a chain,
said reactance means being positioned inside said first frame means and said second frame means with a first of said front faces of said reactance means bearing against the inner face of said upper portion of said first frame means and the second of said front faces bearing against the inner face of said lower portion of said second frame means,
means cooperating with said frame means for exerting an axial blocking pressure on said reactance means.

4. In a high voltage reactance assembly
a high voltage reactance means of generally cylindrical configuration having two opposite front faces, and
means for intercepting the magnetic flux leakage of and for supporting said reactance means including first and second frame means each having at least an annular frame defining a closed, substantially planar magnetic circuit having substantially parallel upper and lower portions, the annular frames of said first and second frame means being interlinked in the manner of a chain, said reactance means being positioned inside said first frame means and said second frame means with a first of said front faces of said reactance means bearing against the inner face of said upper portion of said first frame means and the second of said front faces bearing against the inner face of said lower portion of said second frame means, means cooperating with said frame means for exerting an axial blocking pressure on said reactance means including blocking means maintaining a physical separation between the outer face of said upper portion of said first frame means and the inner face of said upper portion of said second frame means.

5. In a high voltage reactance assembly a high voltage reactance means of generally cylindrical configuration having two opposite front faces, housing means having a wall effectively enclosing said reactance means, means for intercepting the magnetic flux leakage of and for supporting said reactance means within said housing means including first and second frame means each having at least an annular frame defining a closed, substantially planar magnetic circuit having substantially parallel upper and lower portions, the annular frames of said first and second frame means being interlinked in the manner of a chain, said reactance means being positioned inside said first frame means and said second frame means, with a first of said front faces of said reactance means bearing against the inner face of said upper portion of said first frame means, and the second of said front faces bearing against the inner face of said lower portion of said sescond frame means, and securing means for securing said frame means within said housing means, 6. In a high voltage reactance assembly a high voltage reactance means of generally cylindrical configuration having two opposite front faces, housing means having a wall effectively enclosing said reactance means, means for intercepting the magnetic flux leakage of and for supporting said reactance means within said housing means including first and second frame means each having at least an annular frame defining a closed, substantially planar magnetic circuit having substantially parallel upper and lower portions, the annular frames of said first and second frame means being interlinked in the manner of a chain, said reactance means being positioned inside said first frame means and said second frame means with a first of said front faces of said reactance means bearing against the inner face of said upper portion of said first frame means, and the second of said front faces bearing against the inner face of said lower portion of said second frame means, and securing means for securing said frame means within said housing means, means cooperating with said frame means for exerting an axial blocking pressure on said reactance means, including blocking means maintaining a physical separation between the outer face of said upper portion of said first frame means and the innner face of said upper portion of said first frame means and the inner face of said upper portion of said second frame means, additional blocking means maintaining a physical separation between said wall and said lower portion of said second frame means, 7. The high voltage reactance assembly according to claim 2 wherein said frame defining the magnetic circuit comprises magnetic laminations superimposed in planes parallel to the plane of said frame.

8. The high voltage reactance assembly according to claim 1 wherein said reactance means comprises two superimposed coaxial coils each having a first terminal located at the adjacent ends thereof, and a second terminal located at the outer ends thereof, high and low voltage terminal means connected to said first and second terminals, respectively.

9. A high voltage reactance assembly comprising housing means including a dish shaped bottom part, an upper part, a lateral wall and inner partition means rigidly secured to said bottom part, a high voltage reactance means of generally cylindrical configuration having two substantially parallel front faces, means for intercepting the magnetic flux leakage of and supporting said reactance means within said housing means including interlinked first and second frame means, each having at least one frame defining a closed, substantially planar magnetic circuit comprising substantially parallel upper and lower portions connecting respectively the upper and lower ends of two lateral portions, said portions being made of stacks of magnetic laminations parallel to the planes of said circuit, said reactance means being positioned inside said first and second frame means with a first of said front faces bearing against the inner face of said upper portion of said first frame means, and the second of said front faces bearing against the inner face of said lower portion of said secured frame means, a securing means for securing said frame means within said housing means including insulating blocking means for maintaining physical separation between said frame means and said partition means, said partition means defining surfaces substantially parallel to the planes of said laminations.

10. The high voltage reactance assembly according to claim 9 further comprising screw jack means mounted perpendicularly to the planes of said magnetic laminations and bearing against said partition means and said frame means for tightening the contact between the laminations of said frames.

11. The high voltage reactance assembly according to claim 10 further comprising first means contacting said first frame means and said upper part of the housing means and second means contacting said second frame means and said bottom part of the housing means for exerting an axial blocking pressure on said reactance means through said frame means.

12. In a high voltage reactance assembly a high voltage reactance means of generally cylindrical configuration having two opposite front faces, and means for intercepting the magnetic flux leakage of and for supporting said reactance means including first and second frame means each having at least an annular frame defining a closed, substantially planar magnetic circuit having substantially parallel upper and lower portions, the annular frames of said first and second frame means being interlinked in the manner of a chain, said reactance means being positioned inside said first frame means and said second frame means with a first of said front faces of said reactance means bearing against the inner face of said upper portions of said first frame means and the second of said front faces bearing against the inner face of said lower portion of said second frame means, the upper and lower portions of said first frame means being substantially transverse to the corresponding upper and lower portions of said second frame means and disposed in different planes.

13. In a high voltage polyphase inductance assembly,
   a plurality of high voltage reactance means each of generally cylindrical configuration having two opposite front faces,
   and means for intercepting the magnetic flux leakage of and for supporting said reactance means including a first frame means having a frame defining a magnetic circuit and a plurality of second frame means defining a magnetic circuit associated with each of said reactance means respectively,
   each first and second frame means having at least one frame defining a magnetic closed circuit having upper and lower portions connecting respectively the upper and lower ends of two lateral portions, each of said second frame means being interlinked in the manner of a chain with said first frame means,
   said reactance means being in substantial alignment in a single row inside said first frame means, each of said reactance means being further positioned inside an associated frame of said second frame means, one of the front faces of each of said reactance means bearing against the inner face of the upper portion of said first frame means, and the other front face of each of said reactance means bearing against the inner face of the lower portion of the associated frame of said second frame means.

14. In a high voltage polyphase inductance assembly,
   a plurality of high voltage reactance means each of generally cylindrical configuration having two opposite front faces,
   and means for intercepting the magnetic flux leakage of and for supporting said reactance means including a first frame means having a frame defining a magnetic circuit and a plurality of second frame means defining a magnetic circuit associated with each of said reactance means respectively,
   each first and second frame means having at least one frame defining a magnetic closed circuit having upper and lower portions connecting respectively the upper and lower ends of two lateral portions, each of said second frame means being interlinked in the manner of a chain with said first frame means,
   said reactance means being in substantial alignment in a single row inside said first frame means, each of said reactance means being further positioned inside an associated frame of said second frame means, one of the front faces of each of said reactance means bearing against the inner face of the upper portion of said first frame means, and the other front face of each of said reactance means bearing against the inner face of the lower portion of the associated frame of said second frame means,
   the upper and lower portions of said first frame means being substantially transverse to the corresponding upper and lower portions of said second frame means,
   the lateral portions of said first and second frame means being substantially parallel to the axis of symmetry of said reactance means.

15. In a high voltage polyphase inductance assembly,
   a plurality of high voltage reactance means each of generally cylindrical configuration having two opposite front faces,
   and means for intercepting the magnetix flux leakage of and for supporting said reactance means including a first frame means having a frame defining a magnetic circuit and a plurality of second frame means defining a magnetic circuit associated with each of said reactance means respectively,
   each first and second frame means having at least one frame defining a magnetic closed circuit having upper and lower portions connecting respectively the upper and lower ends of two lateral portions, each of said second frame means being interlinked in the manner of a chain with said first frame means,
   said reactance means being in substantial alignment in a single row inside said first frame means, each of said reactance means being further positioned inside an associated frame of said second frame means, one of the front faces of each of said reactance means bearing against the inner face of the upper portion of said first frame means, and the other front face of each of said reactance means bearing against the inner face of the lower portion of the associated frame of said second frame means,
   the upper and lower portions of said first frame means being substantially transverse to the corresponding upper and lower portions of said second frame means,
   the lateral portions of said first and second frame means being substantially parallel to the axis of symmetry of said reactance means,
   means cooperating with said frame means for exerting an axial blocking pressure on said reactance means including blocking means maintaining a physical separation between the outer face of said upper portion of said first frame means and the inner face of said upper portion of said second frame means.

16. In a high voltage polyphase inductance assembly,
   a plurality of high voltage reactance means each of generally cylindrical configuration having two opposite front faces,
   and means for intercepting the magnetic flux leakage of and for supporting said reactance means including a first frame means having a frame defining a magnetic circuit and a plurality of second frame means defining a magnetic circuit associated with each of said reactance means respectively,
   each first and second frame means having at least one frame defining a magnetic closed circuit having upper and lower portions connecting respectively the upper and lower ends of two lateral portions, each of said second frame means being interlinked in the manner of a chain with said first frame means,
   said reactance means being in substantial alignment in a single row inside said first frame means, each of said reactance means being further positioned inside an associated frame of said second frame means, one of the front faces of each of said reactance means bearing against the inner face of the upper portion of said first frame means, and the other front face of each of said reactance means bearing against the inner face of the lower portion of the associated frame of said second frame means,
   the upper and lower portions of said first frame means being substantially transverse to the corresponding upper and lower portions of said second frame means,
   the lateral portions of said first and second frame means being substantially parallel to the axis of symmetry of said reactance means,
   means cooperating with said frame means for exerting an axial blocking pressure on said reactance means including blocking means maintaining a physical separation between the outer face of said upper portion of said first frame means and the inner face of said upper portion of said second frame means,
   additional blocking means maintaining a physical separation between said wall and said lower portion of said second frame means.

17. The high voltage polyphase inductance assembly according to claim 14 wherein said first and second frame means each include a pair of frames defining closed substantially planar magnetic circuits located in substantially parallel planes,
   said reactance means having high voltage connecting means secured to said first front face and extending through an aperture defined by the intersection of the upper portions of said pair of frames of said first frame means with the upper portion of the pair of frames of said second frame means associated with the reactance means.

18. The high voltage polyphase inductance assembly according to claim 14 wherein said frame of said first frame means comprise inner portions, substantially parallel to said lateral portions and mechanically connecting said upper portion with said lower portion thus defining a plurality of windows, each accommodating one of said reactance means.

19. In a high voltage reactance assembly
a high voltage reactance means having a generally cylindrical configuration with two substantially parallel opposite front faces,
and means for intercepting the magnetic flux leakage of said reactance means and for holding said reactance means including two first and second frame means interlinked in the manner of a chain each having
a pair of frames each defining a closed substantially planar magnetic circuit having substantially parallel upper and lower portions connecting respectively the upper and lower ends of two lateral portions, the frames of said pair being located in substantially parallel planes,
said reactance means being positioned inside said first frame means and said second frame means,
a first of said front faces of said reactance means bearing against the inner face of said upper portions of said first frame means,
the second of said front faces of said reactance means bearing against the inner face of said lower portion of said second frame means,
said lateral portions being substantially parallel to the symmetry axis of said reactance means.

20. In a high voltage reactance assembly
a high voltage reactance means having a generally cylindrical configuration with two substantially parallel opposite front faces,
and means for intercepting the magnetic flux leakage of said reactance means and for holding said reactance means including two first and second frame means interlinked in the manner of a chain each having
a pair of frames each defining a closed substantially planar magnetic circuit having substantially parallel upper and lower portions connecting respectively the upper and lower ends of two lateral portions, the frames of said pair being located in substantially parallel planes,
said reactance means being positioned inside said first frame means and said second frame means,
a first of said front faces of said reactance means bearing against the inner face of said upper portions of said first frame means,
the second of said front faces of said reactance means bearing against the inner face of said lower portion of said second frame means,
said lateral portions being substantially parallel to the symmetry axis of said reactance means,
and means cooperating with said housing means and said frame means for applying an axial blocking pressure on said reactance means.

21. In a high voltage reactance assembly
housing means having a wall effectively enclosing
a high voltage reactance means having a generally cylindrical configuration with two substantially parallel opposite front faces,
and means for intercepting the magnetic flux leakage of said reactance means and for holding said reactance means within said housing means, including two interlinked first and second frame means, each having a pair of frames each defining a closed substantially planar magnetic circuit having substantially parallel upper and lower portions connecting respectively the upper and lower ends of two lateral portions, the frames of said pair being located in substantially parallel planes,
said reactance means being positioned inside said first frame means and said second frame means,
a first of said front faces of said reactance means bearing against the inner face of said upper portions of said first frame means,
the second of said front faces of said reactance means bearing against the inner face of said lower portion of said second frame means,
said lateral portions being substantially parallel to the symmetry axis of said reactance means,
securing means for securing said frame means within said housing means,
and means cooperating with said housing means and said frame means for exciting an axial blocking pressure on said reactance means,
including blocking means for holding apart the upper part of said wall and said upper portions of said first frame means and blocking means for holding apart the lower part of said wall and said lower portions of said second frame means.

22. In a high voltage reactance assembly
housing means having a wall effectively enclosing
a high voltage reactance means having a generally cylindrical configuration with two substantially parallel opposite front faces and a high voltage terminal means extending from one of said front faces,
and means for intercepting the magnetic flux leakage of said reactance means and for holding said reactance means within said housing means including two interlinked first and second frame means each having a pair of frames each defining a closed substantially planar magnetic circuit having substantially parallel upper and lower portions connecting respectively the upper and lower ends of two lateral portions, the frames of said pair being located in substantially parallel planes,
said reactance means being positioned inside said first frame means and said second frame means,
a first of said front faces of said reactance means bearing against the inner face of said upper portions of said first frame means,
the second of said front faces of said reactance means bearing against the inner face of said lower portion of said second frame means,
said lateral portions being substantially parallel to the symmetry axis of said reactance means,
the intersection of said upper portions of said first and second frame means defining an aperture through which passes said high voltage terminal means,
securing means for securing said frame means within said housing means,
and means cooperating with said housing means and said frame means for exciting an axial blocking pressure on said reactance means
including blocking means for holding apart the upper part of said wall and said upper portions of said first frame means, and blocking means for holding apart the lower part of said wall and said lower portions of said second frame means.

23. In a high voltage reactance assembly
a first pair of spaced, parallel substantially rectangular laminated frames,
a second pair of spaced, parallel substantially rectangular laminated frames interlinked in the manner of a chain with said first pair of frames and disposed transversely with respect thereto, and
high voltage reactance means disposed within said first and second pairs of frames.

24. In a high voltage reactance assembly
a first pair of spaced, parallel substantially rectangular laminated frames,
a second pair of spaced, parallel substantially rectangular laminated frames interlinked in the manner of a chain with said first pair of frames and disposed transversely with respect thereto, high voltage reactance means having first and second front faces disposed within said first and second pairs of frames with said first front face supported by one side of each of said first pair of frames and said second front face supported by one side of each of said second pair of frames.

References Cited

UNITED STATES PATENTS

| 1,310,299 | 7/1919 | Sclater | 336—215 |
| 1,585,158 | 5/1926 | Livingston | 336—215 |

LEWIS H. MYERS, *Primary Examiner.*

D. A. TONE, *Assistant Examiner.*